(12) United States Patent
Kim et al.

(10) Patent No.: US 10,986,532 B2
(45) Date of Patent: Apr. 20, 2021

(54) WIRELESS COMMUNICATION METHOD AND WIRELESS COMMUNICATION TERMINAL FOR TRANSMITTING INFORMATION ON BUFFER STATUS

(71) Applicants: WILUS INSTITUTE OF STANDARDS AND TECHNOLOGY INC., Gyeonggi-do (KR); SK TELECOM CO., LTD., Seoul (KR)

(72) Inventors: Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/513,706

(22) Filed: Jul. 17, 2019

(65) Prior Publication Data
US 2019/0342789 A1 Nov. 7, 2019

Related U.S. Application Data

(63) Continuation of application No. 15/808,879, filed on Nov. 9, 2017, now Pat. No. 10,412,621, which is a
(Continued)

(30) Foreign Application Priority Data

May 15, 2015 (KR) .................. 10-2015-0067957
Jun. 15, 2015 (KR) .................. 10-2015-0084394

(51) Int. Cl.
*H04W 72/12* (2009.01)
*H04W 72/04* (2009.01)
(Continued)

(52) U.S. Cl.
CPC .......... *H04W 28/0278* (2013.01); *H04L 5/00* (2013.01); *H04L 27/26* (2013.01); *H04W 72/042* (2013.01);
(Continued)

(58) Field of Classification Search
CPC ....... H04W 74/04; H04W 4/00; H04W 74/08; H04W 74/00; H04W 74/0833; H04L 5/00
See application file for complete search history.

(56) References Cited

U.S. PATENT DOCUMENTS

2015/0043472 A1   2/2015  Seo et al.
2016/0113034 A1*  4/2016  Seok ............... H04W 74/04
                                              370/329
(Continued)

FOREIGN PATENT DOCUMENTS

CA        2918755      3/2015
CN       101801109     8/2010
(Continued)

OTHER PUBLICATIONS

International Search Report for PCT/KR2016/005126 dated Aug. 8, 2016 and its English translation from WIPO (published as WO 2016/186403).
(Continued)

*Primary Examiner* — Iqbal Zaidi
(74) *Attorney, Agent, or Firm* — Ladas & Parry, LLP

(57) ABSTRACT

Provided is a wireless communication terminal wirelessly communicating with a base wireless communication terminal. The wireless communication terminal comprises a transceiver and the processor. The processer receives, by using the transceiver, a wireless signal including a trigger frame from the base wireless communication terminal and transmits, by using the transceiver, buffer status information to the base wireless communication terminal based on the
(Continued)

trigger frame. The buffer status information is included in a QoS control field which signals information on a QoS control of a MAC header.

12 Claims, 12 Drawing Sheets

Related U.S. Application Data continuation of application No. PCT/KR2016/005126, filed on May 13, 2016.

(51) Int. Cl.
*H04W 74/00* (2009.01)
*H04W 72/10* (2009.01)
*H04W 28/02* (2009.01)
*H04L 5/00* (2006.01)
*H04L 27/26* (2006.01)

(52) U.S. Cl.
CPC ..... *H04W 72/1284* (2013.01); *H04W 74/006* (2013.01); *H04W 28/0268* (2013.01); *H04W 72/10* (2013.01)

(56) References Cited

U.S. PATENT DOCUMENTS

2018/0048427 A1* 2/2018 Lou .................... H04L 61/6022
2018/0077601 A1    3/2018 Kim et al.
2018/0288743 A1* 10/2018 Choi .................... H04L 5/0048

FOREIGN PATENT DOCUMENTS

| CN | 101911754 | 12/2010 |
|---|---|---|
| CN | 102369778 | 3/2012 |
| CN | 103906081 | 7/2014 |
| CN | 104081832 | 10/2014 |
| EP | 2 854 443 | 4/2015 |
| WO | 2013/026184 | 2/2013 |
| WO | 2015/005677 | 1/2015 |
| WO | 2015/031464 | 3/2015 |
| WO | 2016/186403 | 11/2016 |

OTHER PUBLICATIONS

Written Opinion of the International Searching Authority for PCT/KR2016/005126 dated Aug. 8, 2016 and its English translation from WIPO (published as WO 2016/186403).
International Preliminary Report on Patentability (Chapter I) for PCT/KR2016/005126 dated Nov. 21, 2017 and its English translation from WIPO (published as WO 2016/186403).
Non-Final Office Action for U.S. Appl. No. 15/808,879 dated Dec. 26, 2018 (now published as US 2018/0077601).
Office Action dated Dec. 3, 2019 for Chinese Patent Application No. 2016800279939 and its English translation provided by Applicant's foreign council.
Yuhui Zeng, "Research on Resource Management and QoS Enhancement for Next Generation Wireless Communication System", Huazhong University of Science & Technology, Wuhan 430074, P.R.China, May 2011, pp. 1-134.

* cited by examiner

FIG. 9

WIRELESS COMMUNICATION METHOD AND WIRELESS COMMUNICATION TERMINAL FOR TRANSMITTING INFORMATION ON BUFFER STATUS

CROSS-REFERENCE TO RELATED APPLICATIONS

This application is a continuation of U.S. patent application Ser. No. 15/808,879 filed on Nov. 9, 2017, which is a continuation of International Patent Application No. PCT/KR2016/005126 filed on May 13, 2016, which claims the priority to Korean Patent Application No. 10-2015-0067957 filed in the Korean Intellectual Property Office on May 15, 2015, and Korean Patent Application No. 10-2015-0084394 filed in the Korean Intellectual Property Office on Jun. 15, 2015, the entire contents of which are incorporated herein by reference.

TECHNICAL FIELD

The present disclosure relates to a wireless communication method and a wireless communication terminal for transmitting information on buffer status.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel. Therefore, required is a technology capable of efficiently using bandwidths by simultaneously transmitting data between a plurality of terminals and base terminals.

DISCLOSURE

Technical Problem

An object of the present invention is to provide an efficient wireless communication method and wireless communication terminal.

Especially, an object of the present invention is to provide a wireless communication method and wireless communication terminal transmitting information on buffer status.

Technical Solution

According to an embodiment of the present invention, a wireless communication terminal wirelessly communicating with a base wireless communication terminal includes: an RF transceiver configured to transmit and receive a wireless signal; and a modulator and demodulator configured to modulate and demodulate the wireless signal, wherein the RF transceiver receives a wireless signal including a random access trigger frame from the base wireless communication terminal, the modulator and demodulator modulates data to be transmitted to the base wireless communication terminal based on the random access trigger frame, and the random access trigger frame indicates a frequency band randomly accessed by a plurality of wireless communication terminals including the wireless communication terminal.

The modulator and demodulator may modulate buffer status information based on the random access trigger frame, the RF transceiver may transmit the modulated buffer status information to the base wireless communication terminal through a random access, and the buffer status information may be stored in a transmission buffer of the wireless communication terminal and indicate information on data waiting for transmission.

The buffer status information may include data size information indicating a size of data stored in the transmission buffer.

The modulator and demodulator may modulate the data size information based on a queue data size field having a variable granularity.

The queue data size field may indicate a size of data stored in the transmission buffer through a variable unit.

The buffer status information may be included in a QoS control field which signals information on a QoS control of a MAC header.

The modulator and demodulator may modulate the buffer status information together with the data, and the RF transceiver may transmit a wireless signal including both the buffer status information and the data.

The buffer status information may include more data information indicating that there is data to be additionally transmitted to the base wireless communication terminal.

The modulator and demodulator may fragment data and modulate both the fragmented data and a fragmentation number, the RF transceiver may transmit a wireless signal including both the fragmented data and the fragmentation number, and the fragmentation number may indicate an order of the fragmented data.

The modulator and demodulator may set a duration value of an L-SIG field based on the random access trigger frame, the L-SIG field may indicate signaling information decoded by both a legacy wireless communication terminal and the wireless communication terminal, and the duration value of the L-SIG field may indicate a duration value of a PLC Protocol Data Unit (PPDU) after the L-SIG field.

The modulator and demodulator may obtain type information from the random access trigger frame and modulate data transmitted to the base wireless communication terminal based on the type information, and the type information may designate a type of data that the wireless communication terminal transmits to the base wireless communication terminal.

The type information may indicate a priority of the data.

According to an embodiment of the present invention, a base wireless communication terminal wirelessly communicating with a plurality of wireless communication terminals includes: an RF transceiver configured to transmit and receive a wireless signal; and a modulator and demodulator configured to modulate and demodulate the wireless signal, wherein the modulator and demodulator modulates a random trigger frame indicating a frequency band randomly accessed by the plurality of wireless communication terminals, and the RF transceiver transmits a wireless signal including the random trigger frame to the plurality of wireless communication terminals and receives a wireless signal including data transmitted based on the random trigger frame from at least one of the plurality of wireless communication terminals.

The RF transceiver may receive buffer status information transmitted through a random access from at least one of the plurality of wireless communication terminals, the buffer status information may be stored in a transmission buffer of at least one of the plurality of wireless communication terminals and indicate data waiting for transmission, and the random access may be based on the random trigger frame.

The buffer status information may include data size information indicating a size of data stored in the transmission buffer.

The modulator and demodulator may modulate the data size information based on a queue data size field having a variable granularity.

The queue data size field may indicate a size of data stored in the transmission buffer through a variable unit.

The buffer status information may be included in a QoS control field which signals information on a QoS control of a MAC header.

The random trigger frame may include a duration value of an L-SIG field to be set by the plurality of wireless communication terminals, the L-SIG field may indicate signaling information decoded by both a legacy wireless communication terminal and the plurality of wireless communication terminals, and the duration value of the L-SIG field may indicate a duration value of PLC Protocol Data Unit (PPDU) after the L-SIG field.

According to an embodiment of the present invention, an operation method of a wireless communication terminal wireless communicating with a base wireless communication terminal includes: receiving a wireless signal including a random access trigger frame from the base wireless communication terminal; and modulating data to be transmitted to the base wireless communication terminal based on the random access trigger frame; and wherein the random access trigger frame indicates a frequency band randomly accessed by a plurality of wireless communication terminals including the wireless communication terminal.

Advantageous Effects

One embodiment of the present invention provides an efficient wireless communication method and wireless communication terminal.

Especially, one embodiment of the present invention is to provide a wireless communication method and a wireless communication terminal transmitting information on buffer status.

DESCRIPTION OF DRAWINGS

FIG. 9 is a view illustrating that when a plurality of stations transmit data to an AP through a random access, the plurality of stations transmit a frame for the NAV setting of a wireless communication terminal to the AP according to an embodiment of the present invention.

BEST MODE FOR CARRYING OUT THE INVENTION

Figure 1:
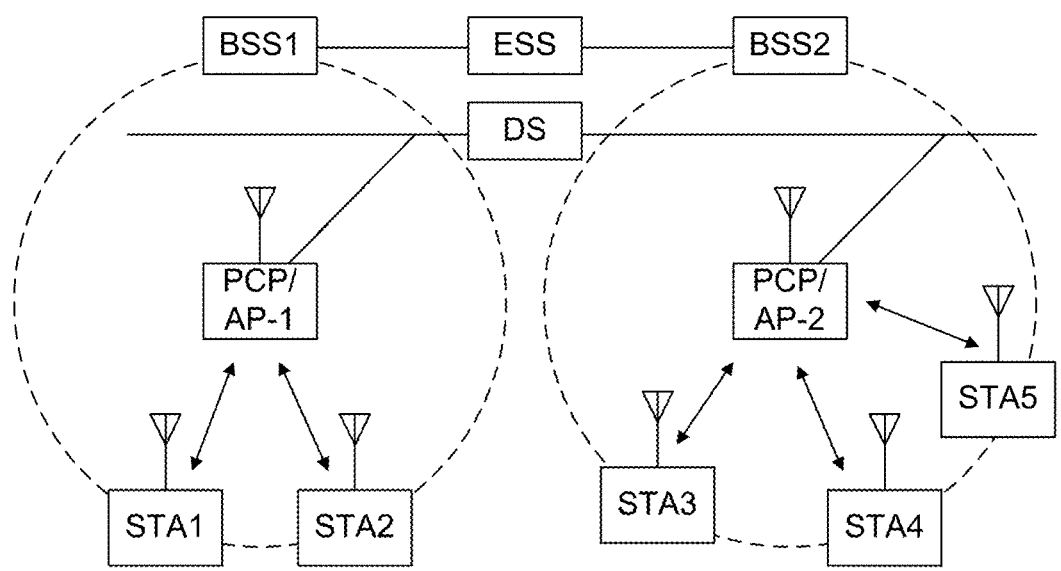
FIG. 1 is a view illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2015-0067957, and Nos. 10-2105-0084394 filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA_d, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
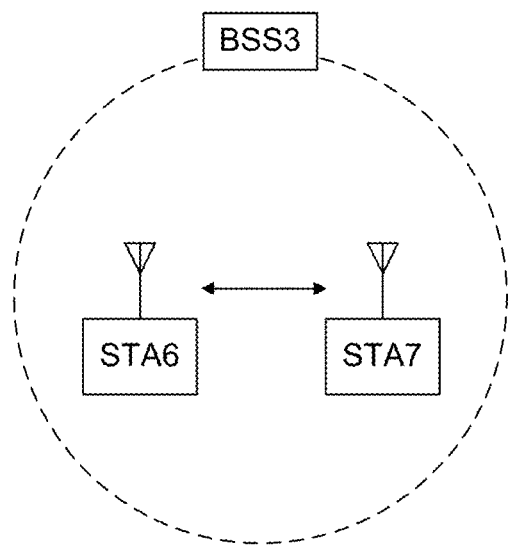
FIG. 2 is a view illustrating a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
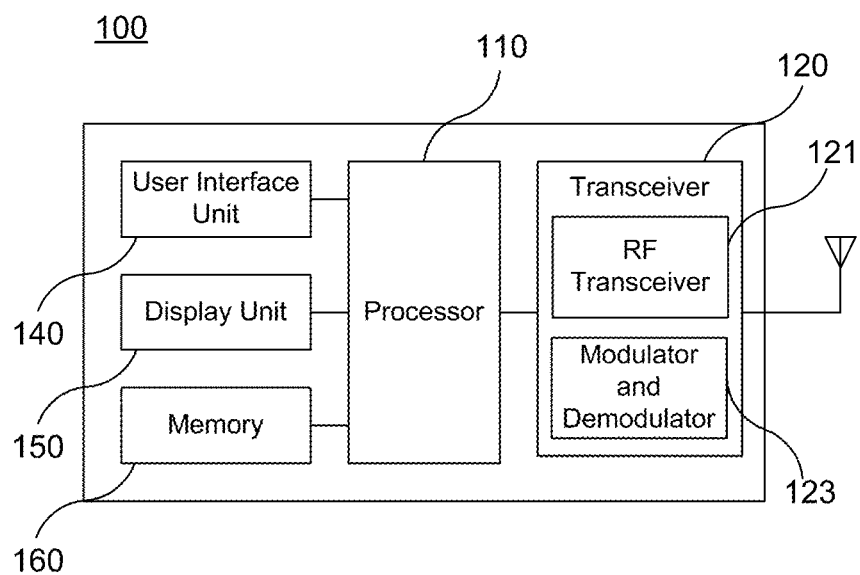
FIG. 3 is a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. Specifically, the transceiver 120 includes an RF transceiver 121 and a modulator/demodulator 123. The RF transceiver 121 transmits and receives a wireless signal. The modulator/demodulator 123 modulates and demodulates the wireless signal. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
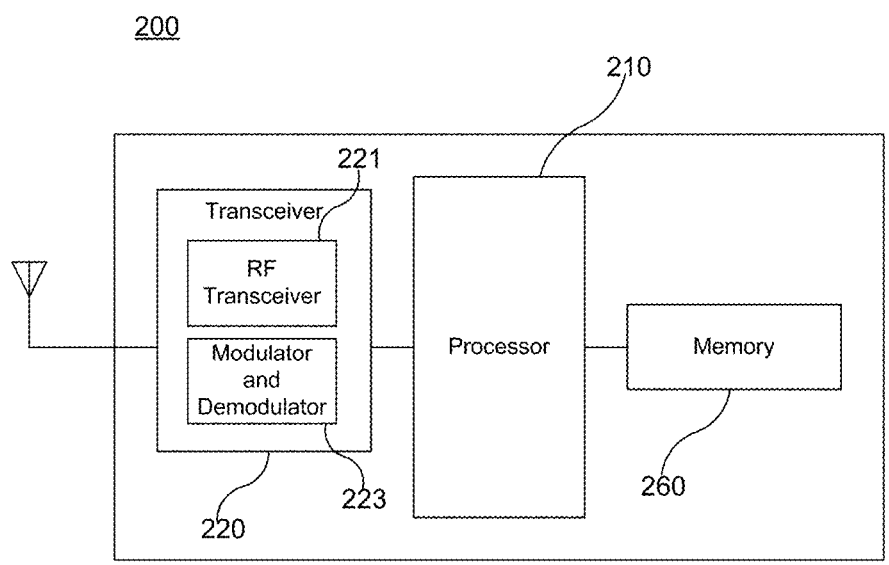
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. Specifically, the transceiver 220 includes an RF transceiver 221 and a modulator/demodulator 223. The RF transceiver 221 transmits and receives a wireless signal. The modulator/demodulator 223 modulates and demodulates the wireless signal. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
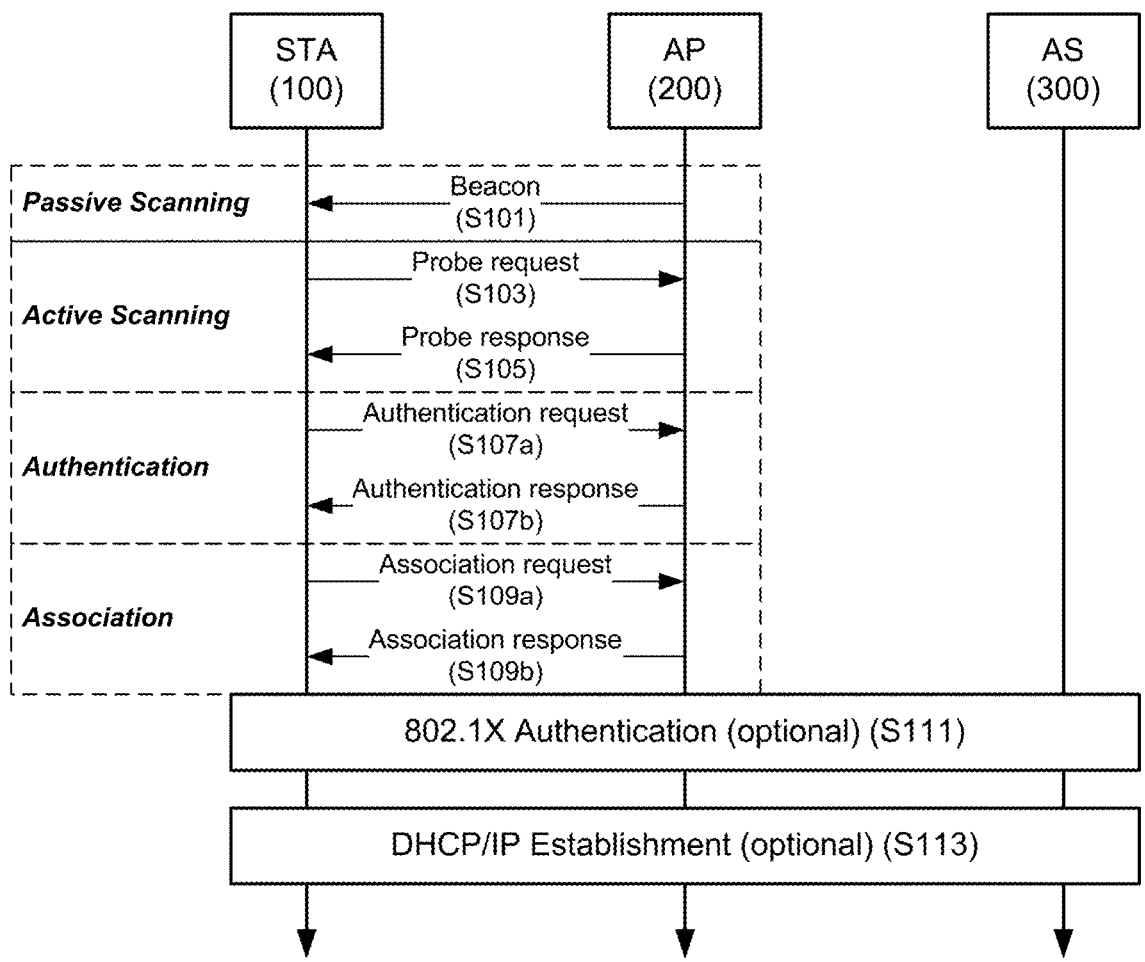
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When data is transmitted using Orthogonal Frequency Division Modulation (OFDMA) or Multi Input Multi Output (MIMO), any one wireless communication terminal may transmit data to a plurality of wireless communication terminals simultaneously. Also, any one wireless communication terminal may simultaneously receive data from a plurality of wireless communication terminals.

For convenience of description, any one wireless communication terminal that communicates simultaneously with a plurality of wireless communication terminals is referred to as a first wireless communication terminal and a plurality of wireless communication terminals that simultaneously communicate with the first wireless communication terminal are referred to as a plurality of second wireless communication terminals. In addition, the first wireless communication terminal may be referred to as a base wireless communication terminal(device). In addition, the first wireless communication terminal may be a wireless communication terminal that allocates a communication medium resource and performs scheduling in communication with a plurality of wireless communication terminals. Specifically, the first wireless communication terminal may perform the role of a cell coordinator. At this time, the first wireless communication terminal may be the access point 200. In addition, the second wireless communication terminal may be the station 100 associated with the access point 200. In a specific embodiment, the first wireless communication terminal may be a wireless communication terminal that allocates a communication medium resource and performs scheduling in an independent network, such as an ad-hoc network, which is not connected to an external distribution service. In addition, the first wireless communication terminal may be at least one of a base station, an eNB, and a transmission point TP.

Through FIGS. 6 to 13, a description will be given of an operation in which a plurality of second wireless communication terminals transmit data and a first wireless communication terminal receives data. In particular, a description will be given of a case where a plurality of second wireless communication terminals transmit data to a first wireless communication terminal on the basis of a random access.

Figure 6:
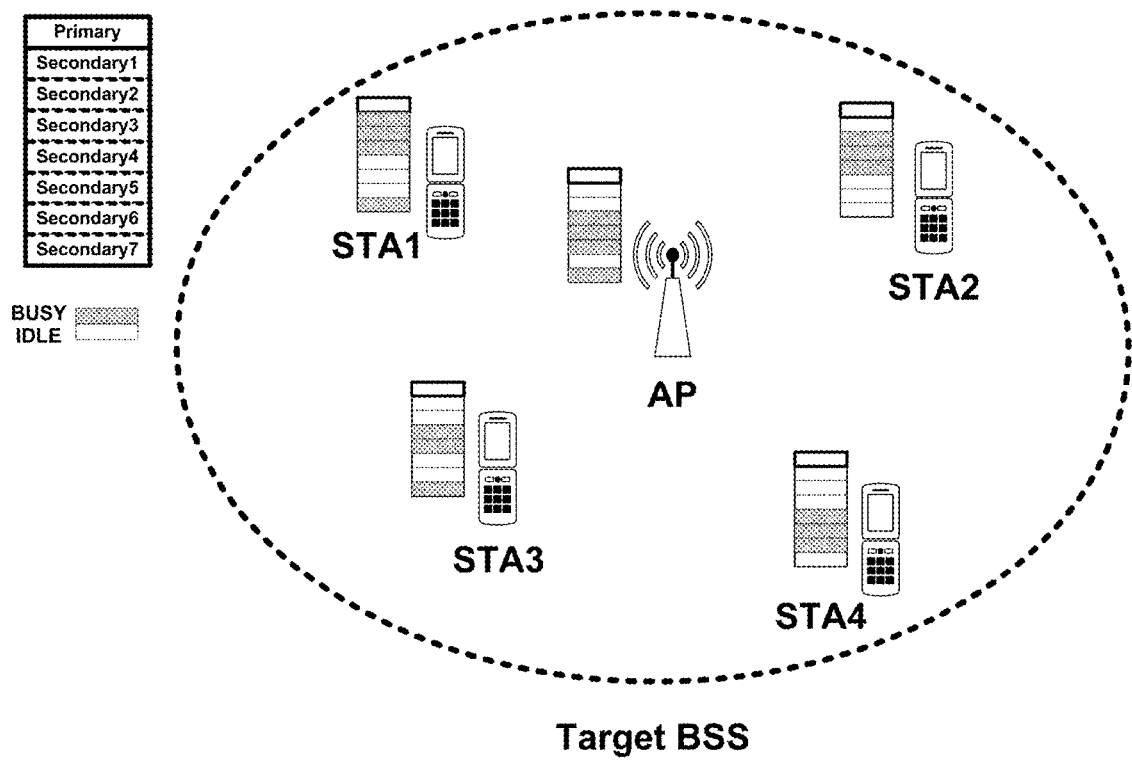
FIG. 6 is a view illustrating a basic service set where a plurality of second wireless communication terminals are located according to an embodiment of the present invention.

FIG. 6 is a view illustrating a basic service set where a plurality of second wireless communication terminals are located according to an embodiment of the present invention.

Since the wireless communication coverage of each wireless communication terminal is different, the channel state detected by the first wireless communication terminal and the plurality of second wireless communication terminals may be different. Therefore, when the first wireless communication terminal allocates a channel to each of the plurality of second wireless communication terminals in consideration of only the channel state detected by the first wireless communication terminal itself, the first wireless communication terminal may allocate to the second wireless communication terminal a channel in which a collision with a wireless communication terminal outside the wireless communication coverage of the first wireless communication terminal may occur. Such a situation will be described with reference to the embodiment of FIG. 6.

In the embodiment of FIG. 6, the access point AP detects the primary channel Primary, the first secondary channel Secondary 1, the second secondary channel Secondary 2, and the sixth secondary channel Secondary 6 as idle channels. However, the first station STA1 detects the primary channel Primary, the fourth secondary channel Secondary 4, the fifth secondary channel Secondary 5, and the sixth secondary channel Secondary 6 as idle channels. In addition, the second station STA2 detects the primary channel Primary, the first secondary channel Secondary 1, the fifth secondary channel Secondary 5, the sixth secondary channel Secondary 6, and the seventh secondary channel Secondary 7 as idle channels. In addition, the third station STA3 detects the primary channel Primary, the first secondary channel Secondary 1, the second secondary channel Secondary 2, the fifth secondary channel Secondary 5, and the sixth secondary channel Secondary 6 as idle channels. In addition, the fourth station STA4 detects the primary channel Primary, the first secondary channel Secondary 1, the second secondary channel Secondary 2, the third secondary channel Secondary 3, and the seventh secondary channel Secondary 7 as idle channels.

At this point, when the access point AP allocates the first secondary channel Secondary 1 to the first station STA1, allocates the second secondary channel Secondary 2 to the second station STA2, allocates the primary channel Primary to the third station STA3, and allocates the sixth secondary channel Secondary 6 to the fourth station STA4, the remaining stations except for the third station STA3 may not use the allocated channels.

In order to prevent such a situation, the first wireless communication terminal should allocate a frequency band to each of the plurality of second wireless communication terminals in consideration of the channel state detected by each of the plurality of second wireless communication terminals. To this end, each of the plurality of second wireless communication terminals may transmit the channel state to the first wireless communication terminal. In addition, the first wireless communication terminal may allocate a frequency band to each of the plurality of second wireless communication terminals in consideration of the channel state of the plurality of second wireless communication terminals.

Allocating the frequency band to each of the plurality of second wireless communication terminals by the first wireless communication terminal through such a process requires transmitting the channel state to the first wireless communication terminal by the second wireless communication terminal. In particular, since the transmission in the unlicensed band presupposes competition with other wireless communication terminals, more time is required in the licensed band, and more time is required as the number of the second wireless communication terminals increases. Accordingly, this process may lower the data transmission efficiency between the first wireless communication terminal and the second wireless communication terminal. In addition, as the number of second wireless communication terminals increases, the first wireless communication terminal must further perform an operation for allocating an optimal frequency band to the second wireless communication terminal. Therefore, there is a need for a method that can efficiently improve this process. This will be described with reference to FIGS. 7 to 14.

In an embodiment of the present invention, the plurality of second wireless communication terminals may randomly access to the first wireless communication terminal. Specifically, the plurality of second wireless communication terminals may randomly select a sub-frequency band within the frequency band designated by the first wireless communication terminal, and transmit data to the first wireless communication terminal through the selected sub-frequency band. This will be described with reference to FIGS. 7 and 8.

Figure 7:
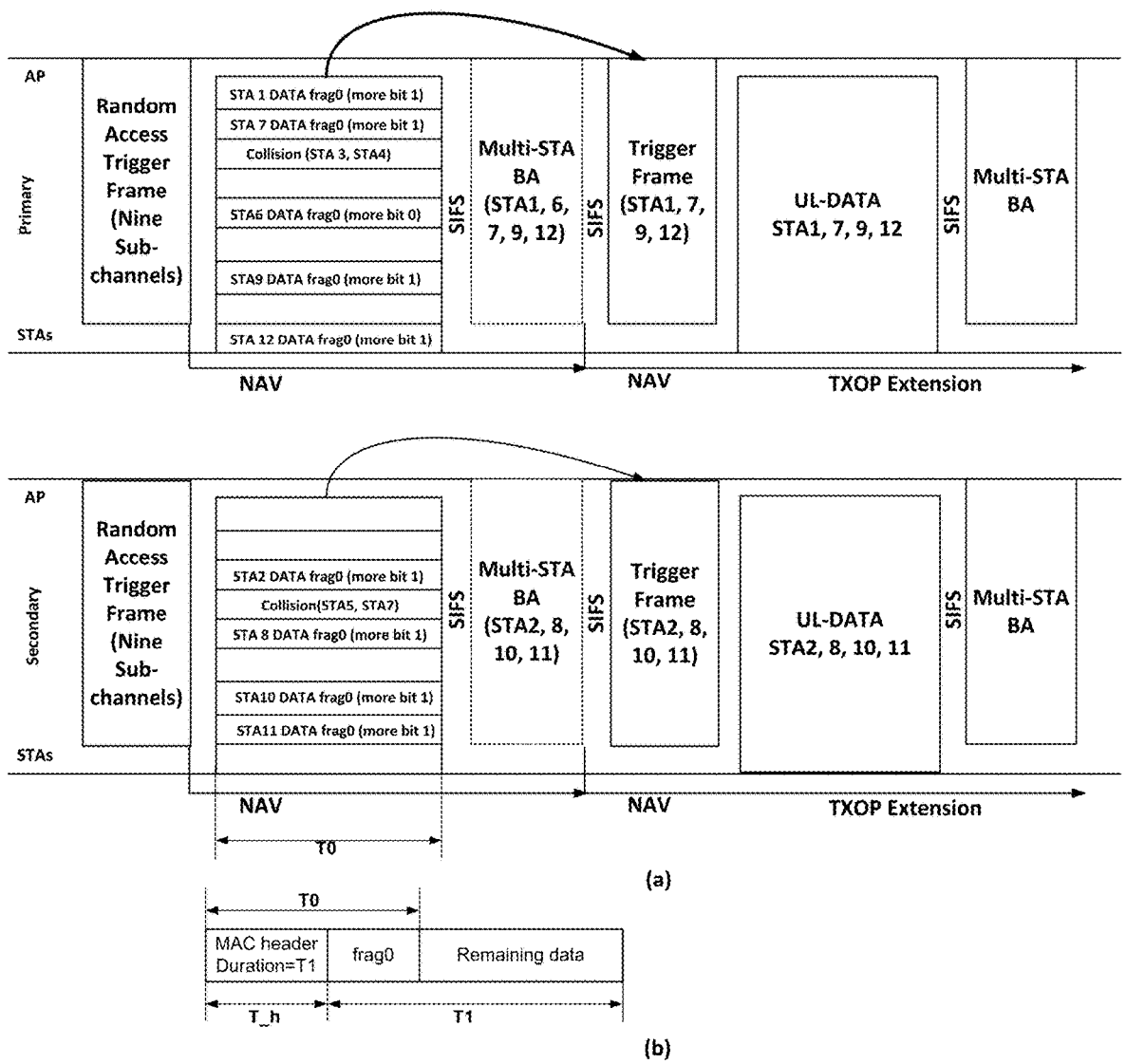
FIG. 7 is a view illustrating that a plurality of stations transmit data to an AP through a random access according to an embodiment of the present invention.

FIG. 7 is a view illustrating that a plurality of stations transmit data to an AP through a random access according to an embodiment of the present invention.

The first wireless communication terminal may designate a frequency band to be randomly accessed by the plurality of second wireless communication terminals. At this time, the first wireless communication terminal may transmit a MAC frame indicating a frequency band to which the plurality of second wireless communication terminals are randomly accessed. For convenience of description, the MAC frame indicating a frequency band allocated to each of the plurality of second wireless communication terminals is referred to as a trigger frame. In addition, the MAC frame indicating a frequency band to which the plurality of second wireless communication terminals are to be randomly accessed among the trigger frames is referred to as a random access trigger frame. Thus, when referring to a trigger frame, it includes a random access trigger frame unless otherwise noted. In addition, a frequency band to which the plurality of second wireless communication terminals are randomly accessed is referred to as a designated frequency band.

Specifically, the random access trigger frame may include information indicating a frequency band to which a plurality of second wireless communication terminals can be randomly accessed, and information indicating a plurality of sub-frequency bands included in the corresponding frequency band. For example, the random access trigger frame may include the number of channels having a unit frequency bandwidth and the number of sub-channels included in each channel. At this time, the unit frequency bandwidth represents a unit value of the frequency bandwidth that the first wireless communication terminal can occupy through one BSS. In a specific embodiment, the unit frequency bandwidth may be 20 MHz.

In addition, the random access trigger frame may include duration allocation information indicating information on a duration allocated to data transmission of the second wireless communication terminal. The duration allocation information may indicate a maximum value of a duration required to transmit data. At this time, the duration may indicate the time required to transmit the MAC Protocol Data Unit (MPDU) including the data. In another specific embodiment, the duration may indicate the duration of a PLCP Protocol Data Unit (PPDU).

In addition, the random access trigger frame may include information indicating a plurality of second wireless communication terminals to be randomly accessed to the first wireless communication terminal.

The second wireless communication terminal may transmit data to the first wireless communication terminal based on the random access trigger frame. Specifically, the second wireless communication terminal may obtain the information on the designated frequency band based on the random access trigger frame, and randomly access to the designated frequency band to transmit the data to the first wireless communication terminal. In a specific embodiment, the second wireless communication terminal may randomly select at least one of a plurality of sub-frequency bands included in the frequency band indicated by the random access trigger frame. At this time, the second wireless communication terminal may transmit data to the first wireless communication terminal through the selected at least one sub-frequency band. Also, the second wireless communication terminal may obtain the duration allocation information from the random access trigger frame, and may transmit the data to the first wireless communication terminal based on the duration allocation information. Specifically, the second wireless communication terminal may transmit the MPDU including the data to the first wireless communication terminal for a time less than or equal to the duration indicated by the duration allocation information. In another specific embodiment, the second wireless communication terminal may transmit the PPDU including the data to the first wireless communication terminal for a duration less than or equal to the duration indicated by the duration allocation information.

At this time, the first wireless communication terminal may determine that the trigger frame is successfully transmitted when any one of the second wireless communication terminals transmits data through the frequency band allocated through the trigger frame or the random access trigger frame. Through this, it is possible to omit the process of transmitting the ACK frame by the second wireless communication terminal. Through this, the first wireless communication terminal may increase the communication efficiency.

The second wireless communication terminal may transmit information on the buffer status to the first wireless communication terminal based on the random access trigger frame. The information on the buffer status is stored in the transmission buffer of the second wireless communication terminal and indicates information on data waiting to be transmitted. More specifically, the information on the buffer status may be more data information indicating that there is additional data to be transmitted. At this time, the more data information may be a 1-bit field indicating whether there is further data to be transmitted. In a specific embodiment, the 1-bit field may be a more data bit field of the MAC header defined in the 802.11 standard. In this way, when the first wireless communication terminal transmits data and the information on the buffer status together, it is not necessary for the first wireless communication terminal to go through a separate contention procedure for transmitting the information on the buffer status, thereby improving the communication efficiency. In addition, when transmitting the buffer status to the first wireless communication terminal through a random access, the plurality of second wireless communication terminals share the opportunity to transmit the buffer status to the first wireless communication terminal. Therefore, it is possible to secure the equal opportunity of the plurality of second wireless communication terminals and to secure the efficiency of data transmission at the same time through such an operation.

In a specific embodiment, the second wireless communication terminal may have a longer duration to transmit data stored in the buffer of the second wireless communication terminal than a duration allocated to data transmission of the second wireless communication terminal. In this case, the second wireless communication terminal may fragment the data to generate a plurality of fragmented data, and may transmit each of the plurality of fragmented data to the first wireless communication terminal. Specifically, the second wireless communication terminal may fragment data based on duration allocation information. At this time, the second wireless communication terminal may transmit the above-described more data information to the first wireless communication terminal together with the data. Also, the second wireless communication terminal may display the order of data through a fragmentation number. Specifically, the second wireless communication terminal may set the fragmentation number of the fragmented data to be transmitted first to zero. Thereafter, the second wireless communication terminal may increase the fragmentation number by 1 each time it transmits further fragmented data. At this time, the sequence numbers of the fragmented data may be the same.

In addition, when receiving the more data information, the first wireless communication terminal may transmit a trigger frame for allocating a frequency band to the wireless communication terminal that transmits the more data information after a predetermined time from receiving the data transmitted together with the more data information. At this time, the trigger frame may indicate a frequency band allocated to the second wireless communication terminal that transmits the more data information. In addition, the predetermined time may be a Short Inter-Frame Space (SIFS) defined in the 802.11 standard.

The specific operations of the first wireless communication terminal and the second wireless communication terminal will be described with reference to FIG. 7. FIG. 7(a) is a view illustrating that a plurality of stations transmit data to an AP through a random access according to an embodiment of the present invention. FIG. 7(b) is a view illustrating the time at which an AP can transmit data through a random access of a plurality of stations and the size of data stored in the buffers of the plurality of stations.

In the embodiment of FIG. 7, the AP allocates T0 as a time to transmit data to a plurality of stations through a random access. At this time, it is assumed that the time required for transmission of the data stored in the buffers of the first station STA1, the second station STA2, and the eighth station STA8 to the twelfth station STA12 is T1, and T1 is larger than T0.

The AP transmits a random access trigger frame indicating that nine sub-channels are allocated to a plurality of stations in each of the primary channel Primary and the secondary channel Secondary. At this time, each of the primary channel Primary and the secondary channel Secondary has a unit frequency bandwidth.

The first to twelfth stations STA1 to STA12 transmit data to the AP based on the random access trigger frame. The first station STA1, the second station STA2, the sixth station STA6, and the eighth station STA8 to the twelfth station STA12 successfully transmit data to the AP. The third to fifth stations STA3 to STA5 and the seventh station STAT do not transmit data to the AP due to a transmission collision.

At this time, the first station STA1, the second station STA2, and the eighth station STA8 to the twelfth station STA12 do not transmit all the data stored in the buffer for the time T0. Therefore, the first station STA1, the second station STA2, and the eighth station STA8 to the twelfth station STA12 set the more data bit to 1 to transmit data to the AP. In addition, the first station STA1, the second station STA2, and the eighth station STA8 to the twelfth station STA12 may set the fragmentation number of the data to zero.

After a predetermined time from when the data is received, the AP transmits a plurality of station block ACK frames (Multi-STA BA) indicating that data is received from the first station STA1, the second station STA2, the sixth station STA6, and the eighth station STA8 to the twelfth station STA12. At this time, the predetermined time is SIFS defined in the 802.11 standard.

The AP transmits a trigger frame after a predetermined time from when the transmission of the plurality of station block ACK frames is completed. At this time, a trigger frame represents a frequency band allocated to the first station STA1, the second station STA2, and the eighth station STA8 to the twelfth station STA12. In addition, the predetermined time is SIFS defined in the 802.11 standard.

The first station STA1, the second station STA2, and the eighth station STA8 to the twelfth station STA12 transmit data to the AP through the frequency band allocated to each of them. In addition, the first station STA1, the second station STA2, and the eighth station STA8 to the twelfth station STA12 may set the fragmentation number of the data to one.

After a predetermined time from when the data is received, the AP transmits a plurality of station block ACK frames (Multi-STA BA) indicating that data is received from the first station STA1, the second station STA2, and the eighth station STA8 to the twelfth station STA12. At this time, the predetermined time is SIFS defined in the 802.11 standard.

Figure 8:
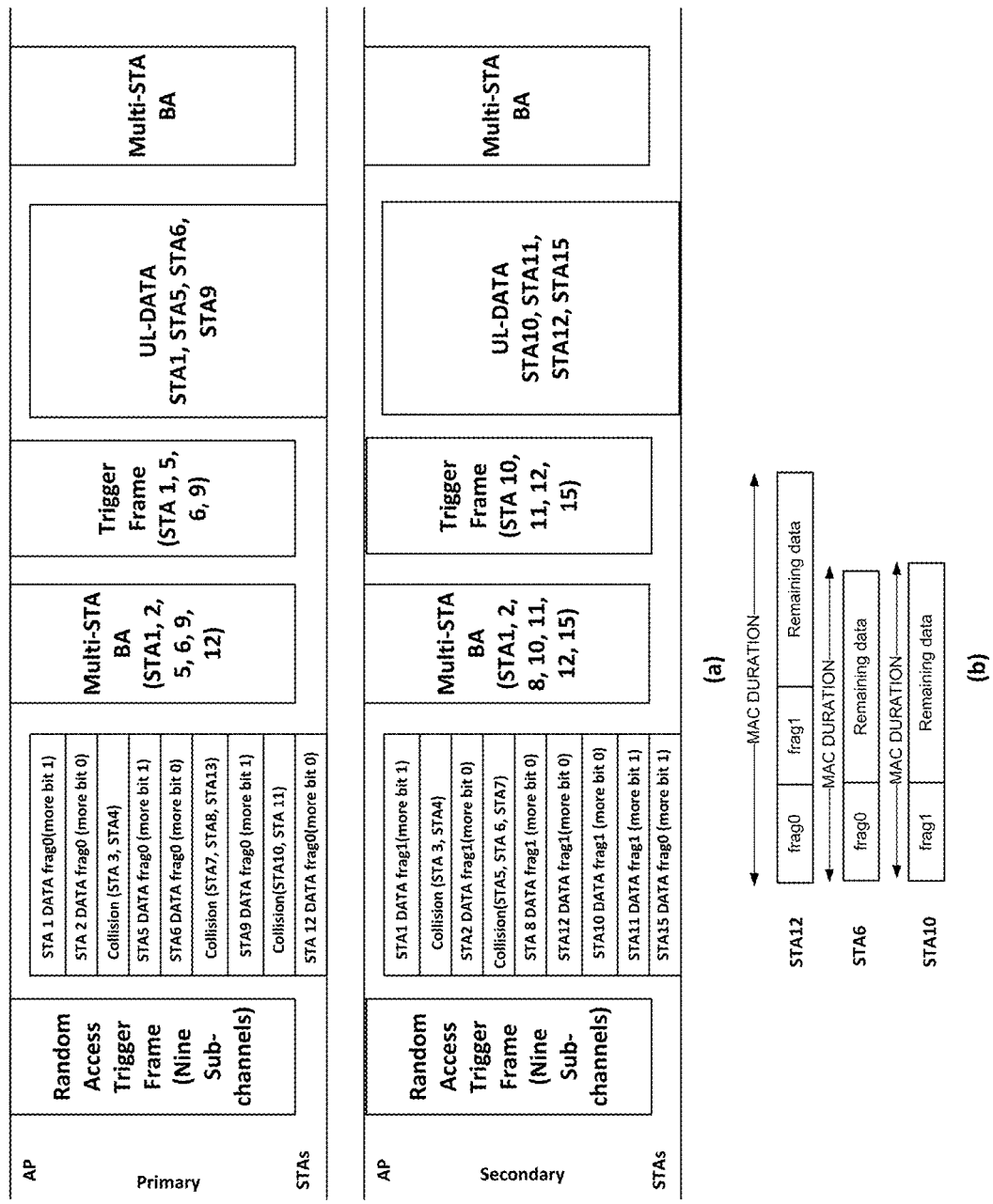
FIG. 8 is a view illustrating that when a plurality of stations according to an embodiment of the present invention transmit data to an AP through a random access, the AP allocates resources to the plurality of stations in consideration of channel conditions of the plurality of stations.

FIG. 8 is a view illustrating that when a plurality of stations according to an embodiment of the present invention transmit data to an AP through a random access, the AP allocates resources to the plurality of stations in consideration of channel conditions of the plurality of stations.

As described in the embodiment of FIG. 7, when the second wireless communication terminal fails to transmit all the data stored in the buffer, the first wireless communication terminal may allocate a frequency band for additional data transmission to the second wireless communication terminal. The first wireless communication terminal may know through which frequency band the second wireless communication terminal accesses during the random access.

Using this, the first wireless communication terminal allocates a frequency band for additional data transmission to the plurality of second wireless communication terminals to the first wireless communication terminal on the basis of the frequency band through which the second wireless communication terminal transmits data through a random access. The first wireless communication terminal may allocate to the corresponding second wireless communication terminal a frequency band through which the second wireless communication terminal transmits data through a random access. In a specific embodiment, the first wireless communication terminal may allocate to the corresponding second wireless communication terminal a sub-frequency band of a frequency band through which the second wireless communication terminal transmits data through a random access.

In addition, the first wireless communication terminal may allocate a frequency band for additional data transmission to the second wireless communication terminal based on the above-described fragmentation number. Specifically, the first wireless communication terminal may allocate a frequency band for additional data transmission to the second wireless communication terminal that transmits data having a discontinuous fragmentation number. At this time, the first wireless communication terminal may allocate a frequency band for additional data transmission to the second wireless communication terminal that transmits the data having the discontinuous fragmentation number irrespective of whether or not the more data information is transmitted. For example, it is assumed that one of the second wireless communication terminals transmits data having a fragmentation number of 1 and does not transmit data having a fragmentation number of 0. In addition, it is assumed that the second wireless communication terminal does not transmit the more data information. In such a case, the first wireless communication terminal may allocate a frequency band for additional data transmission to the second wireless communication terminal.

In addition, the first wireless communication terminal may allocate a frequency band for additional data transmission to the second wireless communication terminal based on the duration value of the MAC header of the MPDU including the data transmitted by the second wireless communication terminal. For example, it is assumed that any one of the second wireless communication terminals transmits data for a shorter time interval than the duration of the MAC header. At this time, the first wireless communication terminal may allocate a frequency band for additional data transmission to the second wireless communication terminal.

The first wireless communication terminal may transmit a trigger frame indicating a frequency band allocated for the additional data transmission. A specific operation of the first wireless communication terminal and the second wireless communication terminal will be described with reference to FIG. 8.

FIG. 8(*a*) shows that the first station STA1 to the fifteenth station STA15 transmit data to the AP. In addition, FIG. 8(*b*) shows the difference between the MAC duration and the time interval in which stations transmit data.

In the embodiment of FIG. 8A, the AP receives data from the first station STA1, the second station STA2, and the twelfth station STA12 through both the primary channel Primary and the secondary channel Secondary. Also, the AP receives data from the fifth station STA5, the seventh station STA6, and the ninth station STA9 through the primary channel Primary. Also, the AP receives data from the eighth station STAB, the tenth station STA10, the eleventh station STA11, and the fifteenth station STA15 through a secondary channel Secondary.

Based on this data transmission of stations, the AP allocates frequency bands for additional data transmission to the stations. Specifically, the AP allocates a frequency band for additional data transmission to the first station STA1, the ninth station STA9, the eleventh station STA11, the twelfth station STA12, and the fifteenth station STA15, which have a more data bit of 1.

In addition, the AP allocates a frequency band for additional data transmission to the tenth station STA10, which transmits data having a more data bit of 0 or a discontinuous fragmentation number. At this time, if some of the fragmented data fails to be transmitted, each station may recognize the fragmented data that fails to be transmitted through the ACK frame transmitted by the AP. Therefore, each station transmits fragmented data that does not receive an ACK frame through a frequency band for additional data transmission.

Also, as shown in FIG. 8(*b*), the sixth station STA6 and the twelfth station STA12 transmit data for a time interval shorter than the MAC duration. Therefore, the AP allocates a frequency band for additional data transmission to the sixth station STA6 and the twelfth station STA12.

Since the fifth station STA5, the sixth station STA6, and the ninth station STA9 transmit data only through the primary channel Primary, the AP allocates the primary channel Primary as a frequency band for additional data transmission to the fifth station STA5, the sixth station STA6, and the ninth station STA9.

Since the tenth station STA10, the eleventh station STA11 and the fifteenth station STA15 transmit data only through the secondary channel Secondary, the AP allocates the secondary channel Secondary as a frequency band for additional data transmission to the tenth station STA10, the eleventh station STA11 and the fifteenth station STA15.

Since the first station STA1 transmits data through both the primary channel Primary and the secondary channel Secondary, the AP may allocate at least one of the primary channel Primary and the secondary channel Secondary, which receive data successfully, to the first station STA1 as a frequency band for additional data transmission. In the embodiment of FIG. 8, the AP allocates a primary channel Primary as a frequency band for additional data transmission.

The AP transmits an ACK frame before transmitting a trigger frame. Specifically, the AP transmits a plurality of station block ACK frames (Multi-STA BA) indicating whether or not the data transmitted by the first station STA1, the second station STA2, the fifth station STA5, the sixth station STA6, the ninth station STA9, and the twelfth station STA12 is transmitted through the primary channel Primary. In addition, the AP transmits a plurality of station block ACK frames (Multi-STA BA) indicating whether or not the data transmitted by the first station STA1, the second station STA2, the eighth station STAB, the tenth station STA10 to the twelfth station STA12, and the fifteenth station STA15 is transmitted through the secondary channel Secondary.

The AP transmits a trigger frame indicating a frequency band for additional data transmission.

The first station STA1, the fifth station STA5, the sixth station STA6, the ninth to twelfth stations STA12, and the fifteenth station STA15 transmit data through a frequency band allocated to each of the first station STA1, the fifth station STA5, the sixth station STA6, the ninth to twelfth stations STA12, and the fifteenth station STA15.

The AP transmits a plurality of station block ACK frames (Multi-STA BA) indicating whether or not the data transmitted by the first station STA1, the fifth station STA5, the sixth station STA6, the ninth to twelfth stations STA12, and the fifteenth station STA15 is received.

As described above with reference to FIGS. 7 and 8, in the case where the second wireless communication terminal directly transmits data during a random access, the process of setting the network allocation vector (NAV) of the hidden wireless communication terminal is omitted. Therefore, a transmission collision may occur by the hidden wireless communication terminal. In addition, the data transmission of the second wireless communication terminal may become invalid due to a transmission collision with a signal transmitted by another wireless communication terminal. In order to solve this problem, the second wireless communication terminal may transmit a frame for setting the NAV of the hidden wireless communication terminal during a random access. This will be described with reference to FIG. 9.

Figure 9:
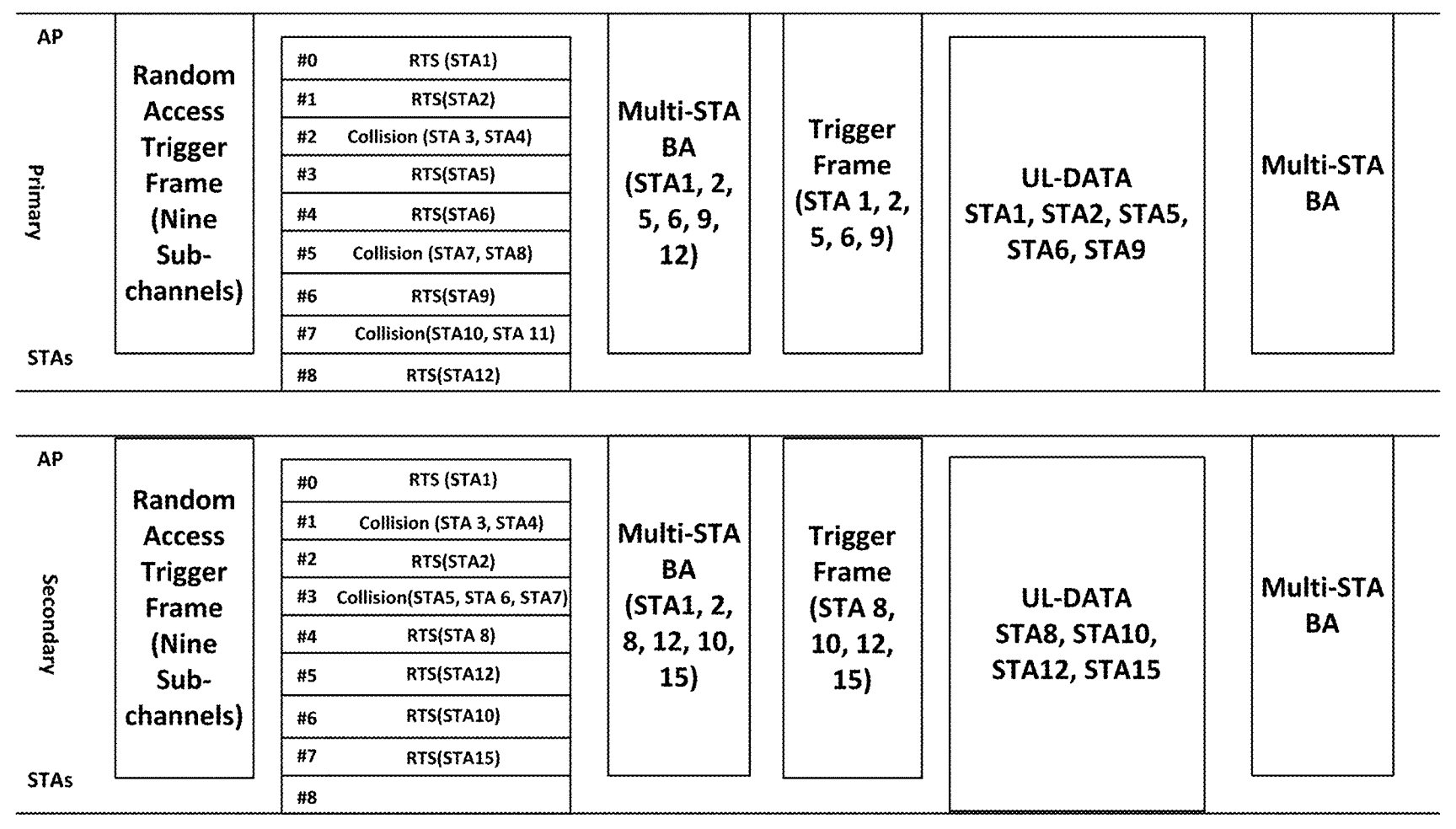

FIG. 9 is a view illustrating that when a plurality of stations transmit data to an AP through a random access, the plurality of stations transmit a frame for the NAV setting of a wireless communication terminal to the AP according to an embodiment of the present invention.

The second wireless communication terminal receiving the random access trigger frame may transmit the frame for NAV setting to the first wireless communication terminal based on the random access trigger frame. Specifically, the second wireless communication terminal may transmit a frame for NAV setting through the frequency band indicated by the random access trigger frame. In a specific embodiment, the second wireless communication terminal may transmit a frame for NAV setting through all the frequency bands determined by the second wireless communication terminal to be idle among the frequency bands indicated by the random access trigger frame.

At this time, the frame for NAV setting may be either a Request To Send (RTS) frame or a Clear To Send (CTS) frame defined in the 802.11 standard.

The frame for NAV setting of the hidden wireless communication terminal may include a frame control field indicating information for frame control. At this time, the frame control field may be a 2-byte field. In addition, the frame for NAV setting of the hidden wireless communication terminal may include a duration field indicating a duration. At this time, the duration field may be a 2-byte field. In addition, the frame for NAV setting of the hidden wireless communication terminal may include an RA field indicating a wireless communication terminal receiving the RTS frame. The RA field may be a 2-byte field. In addition, the frame for NAV setting of the hidden wireless communication terminal may include a TA field indicating a wireless communication terminal transmitting the RTS frame. The TA field may be a 2-byte field. It is clear that the wireless communication terminal receiving the frame for NAV setting of the hidden wireless communication terminal is the first wireless communication terminal in the same BSS. Thus, in a specific embodiment, the RA field may be omitted.

Further, since the second wireless communication terminal can know whether or not the frame for NAV setting of the hidden wireless communication terminal is received through the trigger frame transmitted by the first wireless communication terminal, so that the first wireless communication terminal may immediately transmit the trigger frame without a separate response to the frame for NAV setting of the hidden wireless communication terminal.

The first wireless communication terminal may transmit the trigger frame based on the frame for NAV setting of the hidden wireless communication terminal transmitted by the second wireless communication terminal. Specifically, the first wireless communication terminal provides an allocation to the second wireless communication terminal based on the frame for NAV setting of the hidden wireless communication terminal transmitted by the second wireless communication terminal. The first wireless communication terminal transmits a trigger frame indicating the frequency band allocated to the second wireless communication terminal.

In the embodiment of FIG. 9, the AP transmits a random access trigger frame, and the first station STA1 to the fifteenth station STA15 transmit an RTS frame based on the random access trigger frame.

The AP receives an RTS frame from the first station STA1, the second station STA2, and the twelfth station STA12 through a sub-channel of a primary channel Primary and a sub-channel of a secondary channel Secondary.

The AP receives the RTS frame through the sub-channel of the primary channel Primary from the fifth station STA5, the sixth station STA6, and the ninth station STA9.

The AP receives the RTS frame through the sub-channel of the secondary channel Secondary from the eighth station STA8, the tenth station STA10, and the fifteenth station STA15.

The AP transmits a plurality of station block ACK frames (Multi-STA BA) indicating that the RTS frame is received from the first station STA1, the second station STA2, the fifth station STA5, the sixth station STA6, the eighth station STA8 to the tenth station STA10, the twelfth station STA12, and the fifteenth station STA15. As described above, the transmission of the plurality of station block ACK frames (Multi-STA BA) may be omitted.

The AP allocates a frequency band to the first station STA1, the second station STA2, the fifth station STA5, the sixth station STA6, the eighth station STA8 to the tenth station STA10, the twelfth station STA12, and the fifteenth station STA15. At this time, the AP allocates a primary channel Primary to the fifth station STA5, the sixth station STA6, and the ninth station STA9, which transmit the RTS frame through the sub-channel of the primary channel Primary. In addition, the AP allocates a secondary channel Secondary to the eighth station STA8, the tenth station STA10, and the fifteenth station STA15, which transmit an RTS frame through the sub-channel of the secondary channel Secondary. The AP transmits a primary channel Primary to the first station STA1 and the second station STA2, which transmit the RTS frame, through both the sub-channel of the primary channel Primary and the sub-channel of the secondary channel Secondary. In addition, the secondary channel Secondary is allocated to the twelfth station STA12, which transmits the RTS frame, through both the sub-channel of the primary channel Primary and the sub-channel of the secondary channel Secondary.

The AP transmits a trigger frame indicating a frequency band allocated to the first station STA1, the second station STA2, the fifth station STA5, the sixth station STA6, the eighth station STA8 to the tenth station STA10, the twelfth station STA12, and the fifteenth station STA15. At this time, the trigger frame transmitted through the primary channel represents the station to which the primary channel is allocated, and the trigger frame transmitted through the secondary channel represents the station to which the secondary channel is allocated.

The first station STA1, the second station STA2, the fifth station STA5, the sixth station STA6, the eighth station STA8 to the tenth station STA10, the twelfth station STA12, and the fifteenth station STA15 transmit data based on the trigger frame. At this time, a specific operation of the first station STA1, the second station STA2, the fifth station STA5, the sixth station STA6, the eighth station STA8 to the tenth station STA10, the twelfth station STA12, and the fifteenth station STA15 and an operation of the AP thereafter may be the same as those of the embodiments of FIGS. 7 and 8 described above.

The wireless communication terminal that does not support the embodiment of the present invention may not decode the random access trigger frame and the trigger frame. In addition, as in the embodiments of FIGS. 7 and 8, when the second wireless communication terminal does not transmit a separate frame for NAV setting, the second wireless communication terminal transmits data, and when the first wireless communication terminal transmits a response to the data reception, a transmission collision by the hidden wireless communication terminal may occur. In addition, when a plurality of second wireless communication terminals transmit data of different lengths, the frequency band that ends relatively earlier during the data transmission of the plurality of second wireless communication terminals may be occupied by the other wireless communication terminals. Therefore, a method for solving these problems is needed. This will be described with reference to FIG. 10.

Figure 10:
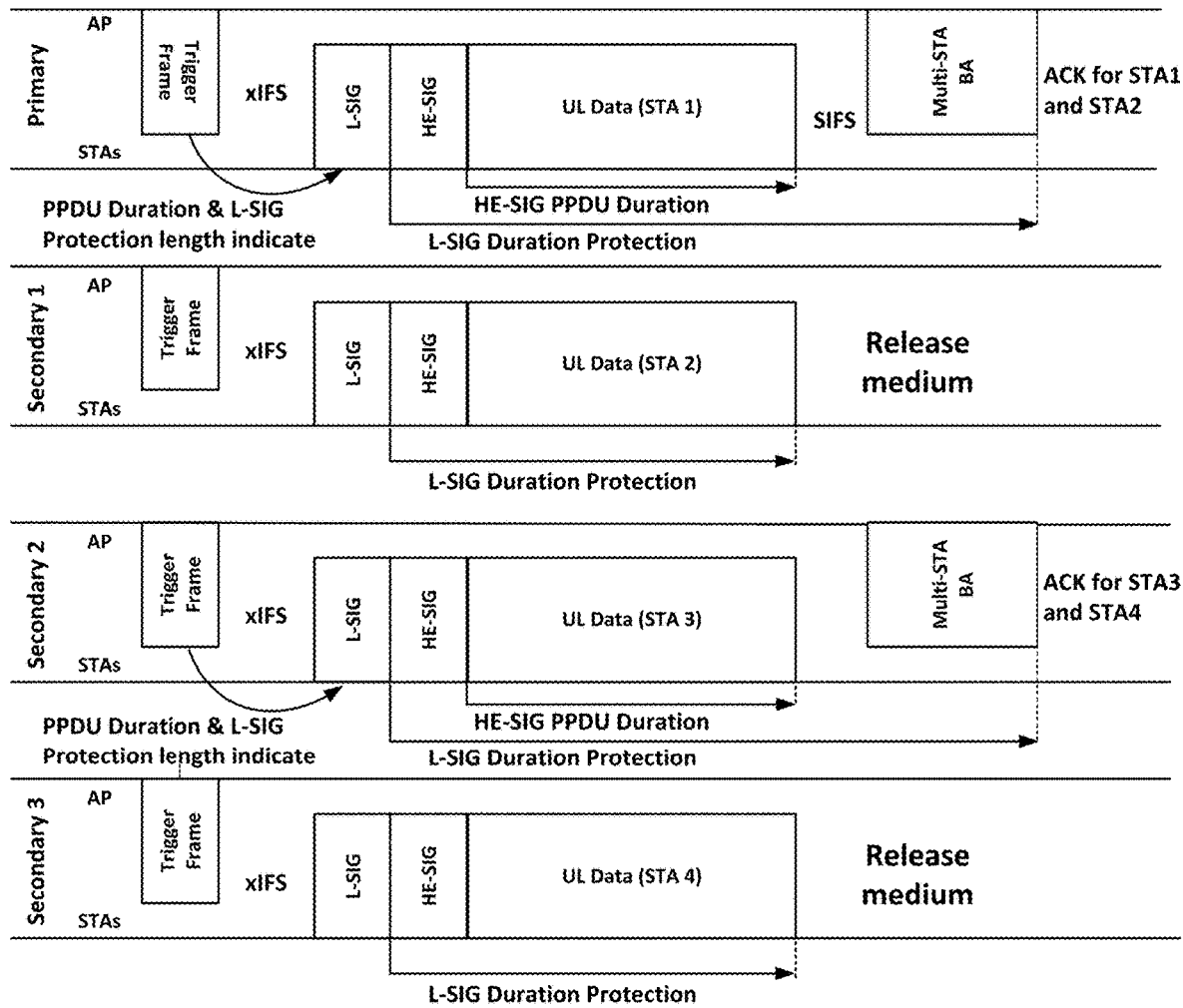
FIG. 10 is a view illustrating that a plurality of stations according to an embodiment of the present invention set an L-SIG duration according to an indication of a trigger frame.

FIG. 10 is a view illustrating that a plurality of stations according to an embodiment of the present invention set an L-SIG duration according to an indication of a trigger frame.

The PPDU transmitted by the wireless communication terminal may include an L-SIG field indicating signaling information that can be decoded by both the legacy wireless communication terminal and the wireless communication terminal. At this time, the L-SIG field may include a duration value. Specifically, the duration value may indicate the length of the PPDU after the L-SIG field. For example, the duration field may be an L-SIG Length field defined in the 802.11 standard.

The first wireless communication terminal may designate the duration value of the L-SIG field to be set when the second wireless communication terminal transmits data. At this time, the first wireless communication terminal may set the duration value of the L-SIG field to a time required for the second wireless communication terminal to transmit data. Specifically, the duration value of the L-SIG field of the first wireless communication terminal may be the duration allocation information described above.

Also, the first wireless communication terminal may set the duration value of the L-SIG field, including the time of transmitting the response to the data transmission of the second wireless communication terminal. At this time, the response to the data transmission of the second wireless communication terminal may be a plurality of station block ACK frames.

Specifically, the second wireless communication terminal may transmit the value of the duration field of the designated L-SIG field through the random access trigger frame. In addition, the second wireless communication terminal may transmit the value of the duration field of the designated L-SIG field through the trigger frame.

When transmitting data based on a trigger frame or a random access trigger frame, the second wireless communication terminal may set the L-SIG duration value of the PPDU including the data based on the trigger frame or the random access trigger frame. Specifically, the second wireless communication terminal obtains the duration value of the L-SIG field from the trigger frame or the random access trigger frame. The second wireless communication terminal sets the L-SIG duration value of the PPDU including the data according to the duration value of the obtained L-SIG field. The second wireless communication terminal transmits the corresponding PPDU to the first wireless communication terminal. At this time, the second wireless communication terminal may transmit the corresponding PPDU to the first wireless communication terminal through the frequency band indicated by the trigger frame or the random access trigger frame.

In addition, the first wireless communication terminal may transmit a response to the data transmission of the second wireless communication terminal through some frequency bands other than all frequency bands used by the first wireless communication terminal. For such a case, the first wireless communication terminal may signal the frequency band to transmit a response for the data transmission of the second wireless communication terminal through the trigger frame. For convenience of explanation, the frequency band through which the first wireless communication terminal transmits the response to the data transmission of the second wireless communication terminal is referred to as a response frequency band. When the second wireless communication terminal transmits data through the frequency band other than the response frequency band, the second wireless communication terminal may transmit the L-SIG field through the response frequency band when transmitting data. At this time, the duration value of the L-SIG field is a value designated by the first wireless communication terminal.

In addition, the first wireless communication terminal may differently designate the duration value of the L-SIG field of the frequency band for transmitting the data and the duration value of the L-SIG field of the response frequency band. In a specific embodiment, the first wireless communication terminal may set the duration value of the L-SIG field of the response frequency band to be smaller than the duration value of the L-SIG field of the frequency band through which the second wireless communication terminal transmits data. In a specific embodiment, the first wireless communication terminal may set the duration value of the L-SIG field of the frequency band through which the second wireless communication terminal transmits data as the duration value allocated for transmitting data to the plurality of second wireless communication terminals.

In the embodiment of FIG. 10, the AP allocates a primary channel Primary to the first station STA1. In addition, the AP allocates a first secondary channel Secondary 1 to the second station STA2. In addition, the AP allocates a second secondary channel Secondary 2 to the third station STA3. In addition, the AP allocates a third secondary channel Secondary 3 to the fourth station STA4.

At this time, the AP transmits a trigger frame indicating a frequency band allocated to the first station STA1 to the fourth station STA4.

In addition, the trigger frame signals that a plurality of station block ACK frames (Multi-STA BA) for the first station STA1 and the second station STA2 are transmitted through a primary channel Primary, and the trigger frame signals that a plurality of station block ACK frames (Multi-STA BA) for the third station STA3 and the fourth station STA4 are transmitted through the second secondary channel Secondary 2.

The AP indicates the duration value of the L-SIG field used by the first to fourth stations STA1 to STA4 through the trigger frame.

The first station STA1 and the third station STA3 set the duration value of the L-SIG field indicating the time until a plurality of station block ACK frames (Multi-STA BA) are received from the AP.

The second station STA2 and the fourth station STA4 set the duration value of the L-SIG field indicating the time until the AP receives data.

Through such an operation, it is possible to prevent a transmission collision with the legacy wireless communication terminal or the hidden wireless communication terminal, which does not support the embodiment of the present invention.

Through FIGS. 7 and 8, it is described that the second wireless communication terminal can transmit the information on the buffer status to the first wireless communication terminal on the basis of the random access. Further, it is described that the second wireless communication terminal can transmit the information on the buffer status together with the data to the first wireless communication terminal. In such an embodiment, the second wireless communication terminal may also transmit information on the size of the data stored in the buffer. A method in which the second wireless communication terminal transmits information on the data size stored in the buffer will be described with reference to FIG. 11 through FIG. 13.

Figure 11:
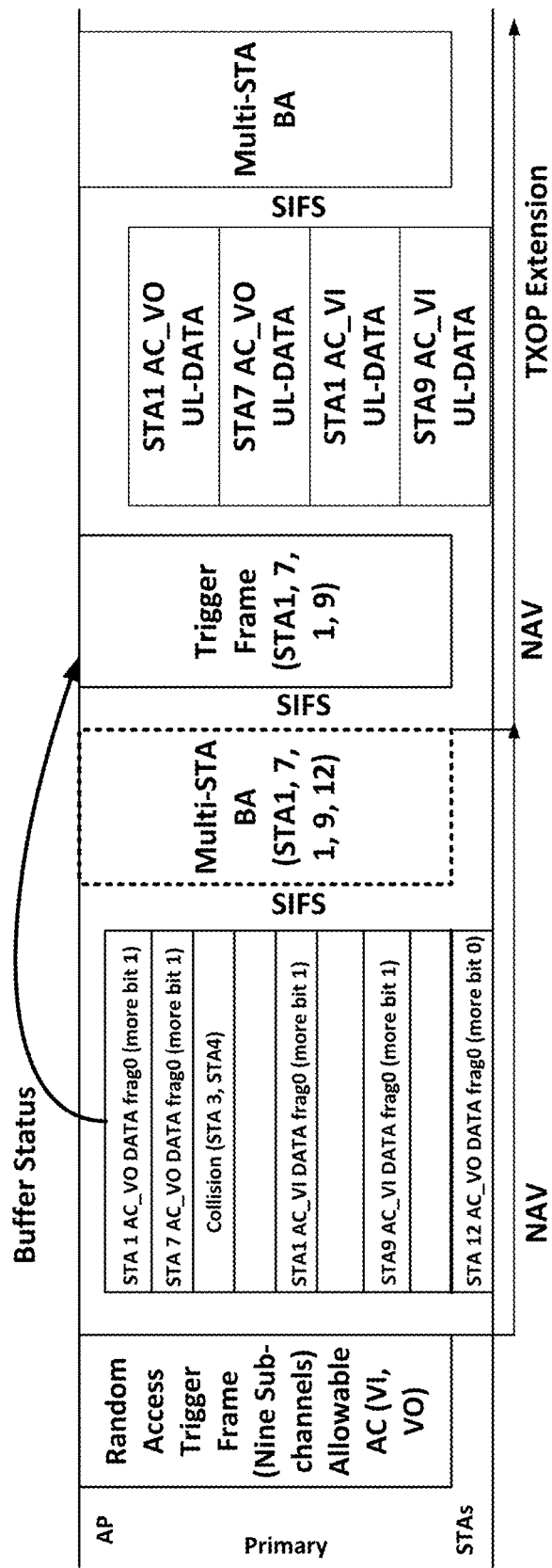
FIG. 11 is a view illustrating that when a plurality of stations according to an embodiment of the present invention transmit data to an AP through a random access, the plurality of stations transmit the data to the AP based on an access category.

FIG. 11 is a view illustrating that when a plurality of stations according to an embodiment of the present invention transmit data to an AP through a random access, the plurality of stations transmit the data to the AP based on an access category.

As described above, the second wireless communication terminal may transmit information on the buffer status based on the trigger frame. At this time, the trigger frame may be a random access trigger frame. In addition, the information on the buffer status may be the size of the data stored in the buffer of the second wireless communication terminal. When the second wireless communication terminal transmits information on the buffer status together with the data, the information on the buffer status may be the size of data remaining in the buffer after transmitting the data.

Further, the second wireless communication terminal may transmit information on the buffer status together with the data when transmitting the data to the first wireless communication terminal regardless of the trigger frame. At this time, the information on the buffer status may be the size of the data stored in the buffer of the second wireless communication terminal.

In such specific embodiments, the second wireless communication terminal may signal the data size stored in the buffer through a field indicating QoS related information of the MAC header. Specifically, the eighth bit to the fifteenth bit (B8 to B15) of the QoS Control field of the MAC header may indicate the data size stored in the buffer of the second wireless communication terminal. Also, the second wireless communication terminal may signal that the QoS Control field indicates the size of data stored in the buffer through the type field and the subtype field of the QoS Control field. At this time, the value of the type field may be binary number 10, and the value of the Subtype field may be binary number 1101. The value of the type field is binary number 10 and the value of the Subtype field is binary number 1101, which are not currently used by the 802.11 standard. According to a specific embodiment, other type field and Subtype field values not used in the 802.11 standard may indicate that the QoS Control field is the size of data stored in the buffer.

Also, the second wireless communication terminal may transmit the data size stored in the buffer for each data type. Specifically, the second wireless communication terminal may transmit the data size stored in the buffer for each access category.

The first wireless communication terminal receives information on the buffer status from the second wireless communication terminal as described above. At this time, the first wireless communication terminal allocates a frequency band for additional data transmission to the plurality of second wireless communication terminals based on the information on the buffer status.

Moreover, the trigger frame may include type information for specifying the type of data transmitted by the second wireless communication terminal. At this time, the type of data may indicate the type of priority that data has. For example, the type of data may be an access category defined in the 802.11 standard. Specifically, the access category may include at least one of Management, Control, AC_VI, AC_VO, AC_BE, and AC_BK. Further, Management and Control may be further classified according to whether they are associated with the first wireless communication terminal.

The second wireless communication terminal transmits data to the first wireless communication terminal based on the type information of the trigger frame. Specifically, the second wireless communication terminal obtains the type information from the trigger frame. The second wireless communication terminal transmits data to the first wireless communication terminal according to the obtained type information. When the type information allows a plurality of types of data, the first wireless communication terminal may transmit data by each type. Specifically, when the type information included in the random access trigger frame allows a plurality of access categories, the second wireless communication terminal may transmit data by performing a random access for each access category. For example, the second wireless communication terminal may transmit data corresponding to AC_VI using a random access through the first sub-channel of the primary channel, and transmit data corresponding to AC_VO using a random access through the second sub-channel of the primary channel.

The first wireless communication terminal sets a NAV required until transmission of a response to the data transmission of the second wireless communication terminal is completed through the trigger frame. At this time, the response to the data transmission of the second wireless communication terminal may be the plurality of station block ACK frames described above. In addition, in a specific embodiment, when there is the additional data transmission described with reference to FIG. 7 to FIG. 8, the first wireless communication terminal may set a NAV required for the additional data transmission through the plurality of station block ACK frames. Operations of the first wireless communication terminal and the second wireless communication terminal will be described in detail with reference to FIG. 11.

In the embodiment of FIG. 11, a Random Access Trigger Frame signals that a station can transmit data corresponding to AC_VO or AC_VI.

The first station STA1, the seventh station STA7, and the twelfth station STA12 transmit data corresponding to AC_VO to the AP through a random access.

The first station STA1 and the ninth station STA9 transmit data corresponding to AC_VI to the AP through a random access. At this time, the first station STA1 transmits data corresponding to AC_VO and data corresponding to AC_VI through an independent random access.

At this time, the first station STA1, the seventh station STA7, the ninth station STA9, and the twelfth station STA12 transmit the size of data remaining in the buffer together with the data after data transmission. In addition, the first station STA1, the seventh station STA7, the ninth station STA9, and the twelfth station STA12 transmit more data information together.

Based on the size of data remaining in the buffer and the more data information transmitted by the first station STA1, the seventh station STA7, the ninth station STA9, and the twelfth station STA12, a frequency band for additional data transmission is allocated to each of the first station STA1, the seventh station STA7, the ninth station STA9, and the twelfth station STA12.

The additional data transmission operation may be the same as the operation of the first wireless communication terminal and the second wireless communication terminal described with reference to FIGS. 7 and 8.

As described above, the Random Access Trigger Frame transmitted by the first wireless communication terminal sets a NAV until the transmission of the plurality of the station block ACK frames (Multi-STA BA) of the first wireless communication terminal is completed. Also, the plurality of station block ACK frames (Multi-STA BA) transmitted by the first wireless communication terminal sets a NAV until the transmission of the plurality of block ACK frames (Multi-STA BA) for the additional data transmission is completed.

Figure 12:
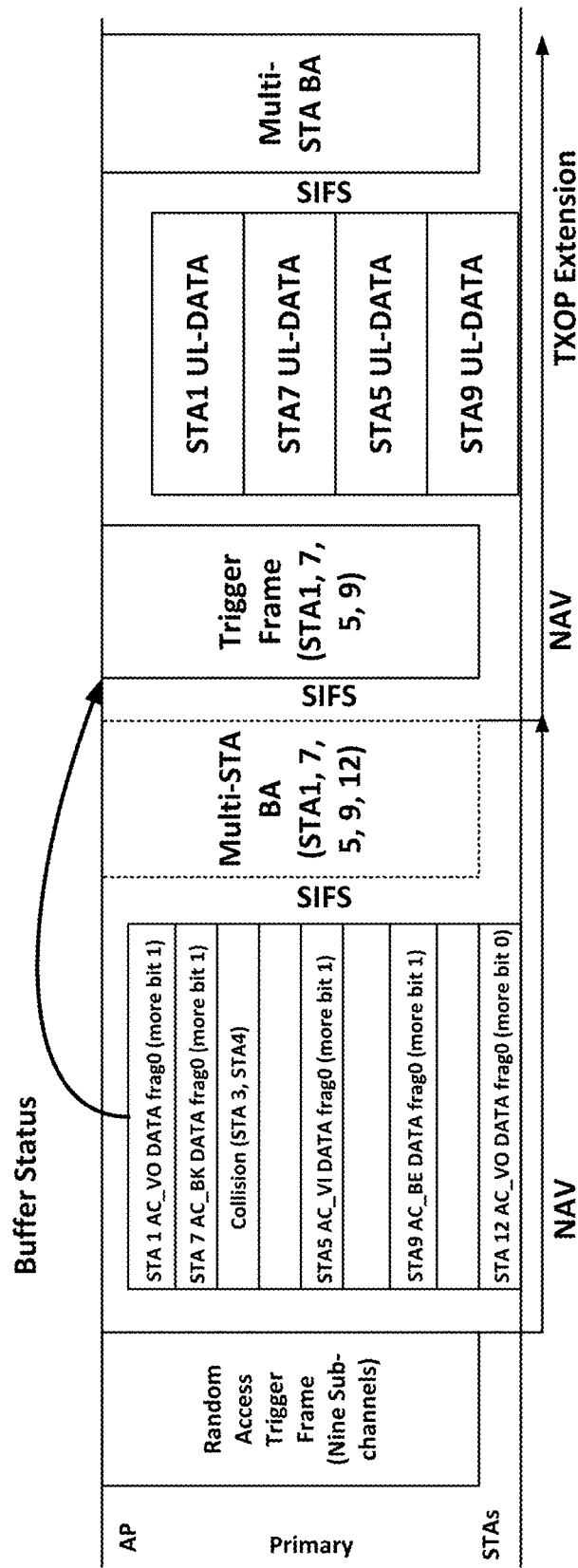
FIG. 12 is a view illustrating that when a plurality of stations according to an embodiment of the present invention transmit data to an AP through a random access, the plurality of stations transmit the data corresponding to one access category.

FIG. 12 is a view illustrating that when a plurality of stations according to an embodiment of the present invention transmit data to an AP through a random access, the plurality of stations transmit the data corresponding to one access category.

The second wireless communication terminal may transmit only data corresponding to any one type in any one transmission interval. At this time, the second wireless communication terminal may transmit data based on internal competition. Specifically, the second wireless communication terminal performs internal competition based on an access category to transmit data corresponding to any one of the access categories. At this time, the second wireless communication terminal may use a backoff parameter according to the access category. For example, the second wireless communication terminal may transmit data corresponding to an access category having a low backoff parameter, prior to data corresponding to an access category having a high backoff parameter.

In the embodiment of FIG. 12, the AP may also designate whether or not data to be transmitted by the second wireless communication terminal through the trigger frame is Management and Control. At this time, the AP may designate whether or not the station is associated with the AP. Specifically, when the AP and the station are associated with each other and the data specified by the trigger frame is Management and Control, the station may transmit buffer status information to the AP. Specifically, when the AP and the station are not associated with each other and the data specified by the trigger frame is Management and Control, the station may transmit a frame required for network access. At this time, the frame required for network access may include at least one of a probe request frame and an association request frame.

In addition, the station may classify the types of packets to be transmitted as duration allocation information in the trigger frame. Specifically, when the station and the AP are not associated with each other and the data specified by the trigger frame is Management and Control, if the allocated duration is a size enough to transmit the Association Request frame, the station may transmit the Association Request frame.

The first station STA1 to the fifteenth station STA1 select any one of the access categories through internal competition. The first station STA1 to the fifteenth station STA15 transmit data corresponding to the selected access category to the AP. Specifically, the first station STA1 transmits data corresponding to AC_VO to the AP. In addition, the fifth station STA5 transmits data corresponding to AC_VI to the AP. In addition, the ninth station STA9 transmits data corresponding to AC_BE to the AP. In addition, the seventh station STA12 transmits data corresponding to AC_VO to the AP.

The other operations of the AP and the first station STA1 to the fifteenth station STA15 may be the same as those described with reference to FIG. 11.

As described above, the second wireless communication terminal may transmit the data size stored in the buffer through the field indicating the QoS related information of the MAC header. However, the range of data that can be transmitted by the wireless communication terminal may vary widely due to the development of the wireless communication speed. In addition, when the field indicating the QoS related information is a previously defined field, the size of the field indicating QoS related information can not be changed. Therefore, in order to indicate the size of data stored in the buffer of the second wireless communication terminal, the length of the field indicating the QoS-related information may not be sufficient. Therefore, a method is needed to solve this problem. This will be described with reference to FIG. 13.

Figure 13:
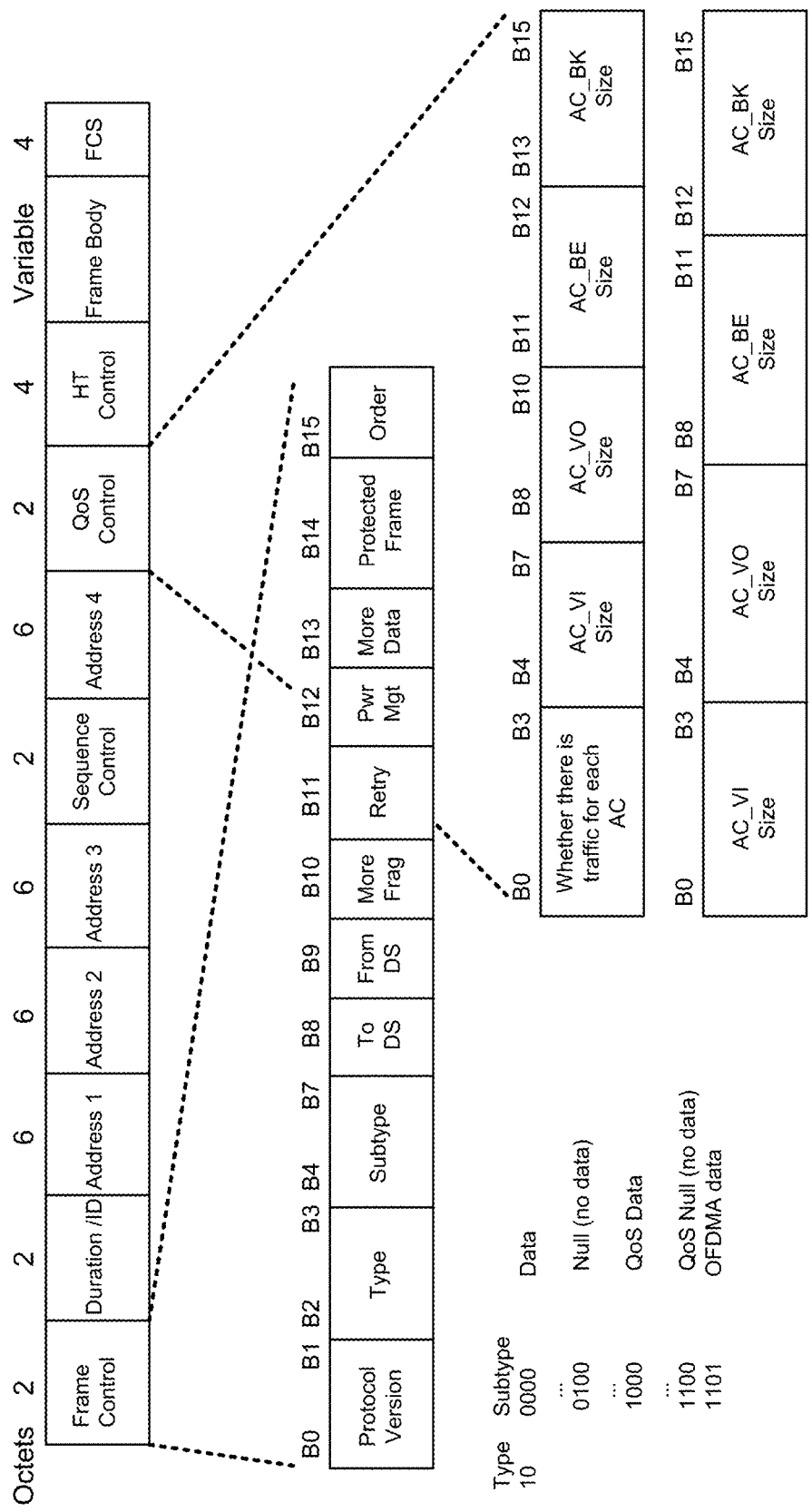
FIG. 13 is a view illustrating a format of a QoS control field of a MAC header when a plurality of stations according to an embodiment of the present invention transmit a buffer status through the QoS Control field of the MAC header.

FIG. 13 is a view illustrating a format of a QoS control field of a MAC header when a plurality of stations according to an embodiment of the present invention transmit a buffer status through the QoS Control field of the MAC header.

The second wireless communication terminal may transmit the data size stored in the buffer through a field having a variable granularity. For convenience of description, a field indicating the size of data stored in the buffer is referred to as a queue data size field. Specifically, the queue data size field may indicate the size of data stored in the buffer through a variable unit. For example, the queue data size field may represent the data size through a plurality of classes, and the data size difference between the plurality of classes may be uniform. At this time, the data size difference may be changeable. In addition, the granularity of the queue data size field may be determined according to the type of data. Specifically, the granularity of the queue data size field may be determined according to the access category of the data.

In another specific embodiment, the second wireless communication terminal may determine the granularity of the queue data size field. In such a case, the second wireless communication terminal may transmit a value indicating the granularity together with the information on the buffer status.

In another specific embodiment, the first wireless communication terminal may determine the granularity of the queue data size field. At this time, the first wireless communication terminal may signal the granularity of the queue data size field through the trigger frame.

In addition, the queue data size field may indicate the size of data stored in the buffer according to the type of data. Specifically, the queue data size field may indicate the size of data stored in the buffer according to each access category.

The queue data size field may represent the size of the data in a plurality of classes. The plurality of classes may be divided into equal sizes. In another specific embodiment, the plurality of classes may be divided into non-uniform sizes. Specifically, as the class is larger, the size difference between classes may be increased. For example, class 0 represents 128 bytes, class 1 represents 256 bytes, class 3 represents 512 bytes, and class 4 represents 1,024 bytes. Through this, the size of relatively small data may be accurately represented.

As in the embodiment of FIG. 13, the QoS Control field may be a 16-bit field. In a specific embodiment, the first to fourth bits (B0 to B3) of the QoS Control field may indicate the presence or absence of data for each data type. The fifth to fifteenth bits (B4 to B15) of the QoS Control field may be the queue data size field. Specifically, the queue data size field may indicate the data size for each data type by 3 bits. In such a case, the queue data size field indicates the data size for each data type by class 8.

For example, if the value of the queue data size field is 0, the data size is zero. Also, if the value of the queue data size field is 1, the data size is class 1. Also, if the value of the queue data size field is 2, the data size is class 2. Also, if the value of the queue data size field is 3, the data size is class 3. Also, if the value of the queue data size field is 4, the data size is class 4. Also, if the value of the queue data size field is 5, the data size is class 5. Also, if the value of the queue data size field is 6, the data size is class 6. Also, if the value of the queue data size field is 7, the data size is class 7.

As described above, the size difference between the classes may be even. In such a case, the data size indicated by each class may be determined depending on the maximum size according to the data type. In addition, as described above, the size difference between the classes may be uneven.

In another specific embodiment, the first to fifteenth bits (B0 to B15) of the QoS Control field may be the queue data size field. In such a case, the queue data size field may represent the data size for each data type by 4 bits. At this time, the queue data size field indicates the data size for each data type by class 16.

At this time, the data type may be an access category.

Also, as described above, the Type field and the Subtype field of the QoS Control field may indicate that QoS Control includes information on the buffer status. At this time, the value of the Type field may be binary number 10, and the value of the Subtype field may be binary number 1101.

Figure 14:
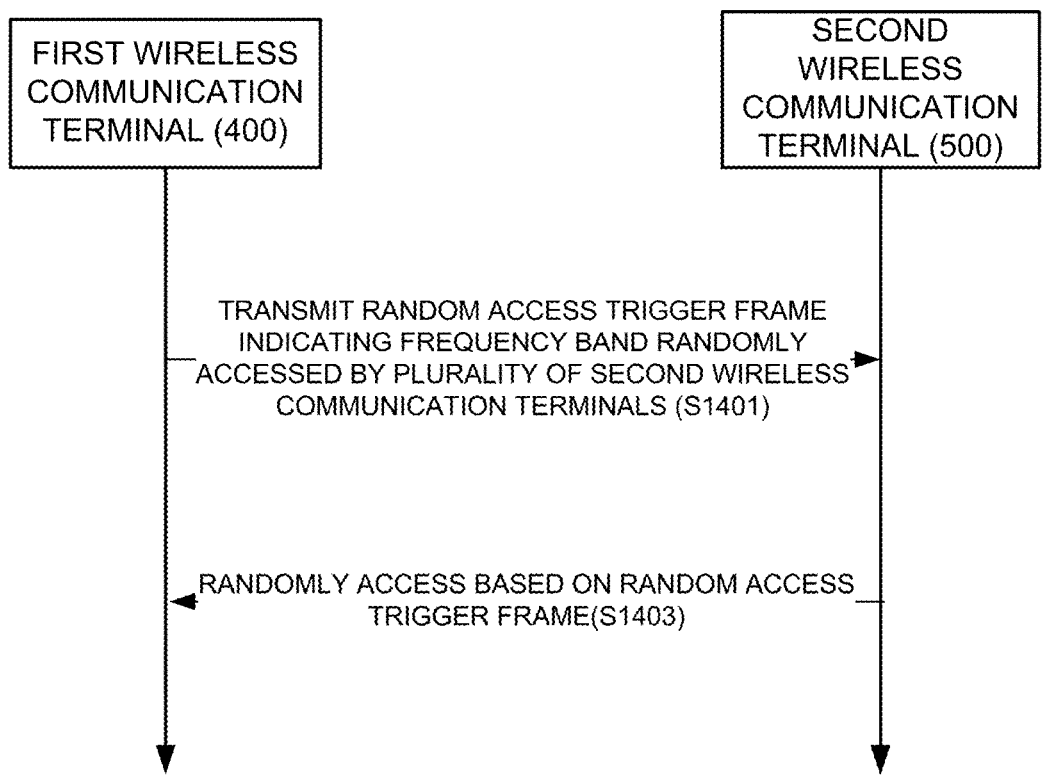
FIG. 14 is a ladder diagram illustrating operations of a first wireless communication terminal and a second wireless communication terminal according to an embodiment of the present invention.

FIG. 14 is a ladder diagram illustrating operations of a first wireless communication terminal and a second wireless communication terminal according to an embodiment of the present invention.

The first wireless communication terminal 400 transmits a random access trigger frame indicating a frequency band to be randomly accessed by the plurality of second wireless communication terminals 500 (S1401).

Specifically, the random access trigger frame may include information indicating a frequency band to which a plurality of second wireless communication terminals 500 can be randomly accessed, and information indicating a plurality of sub-frequency bands included in the corresponding frequency band. For example, the random access trigger frame may include the number of channels having a unit frequency bandwidth and the number of sub-channels included in each channel.

In addition, the random access trigger frame may include duration allocation information indicating information on a duration allocated to data transmission of the second wireless communication terminal 500. The duration allocation information may indicate a maximum value of a duration required to transmit data. At this time, the duration may indicate the time required to transmit the MPDU including the data. In another specific embodiment, the duration may indicate the duration of a PPDU.

In addition, the random access trigger frame may include information indicating a plurality of second wireless communication terminals to be randomly accessed to the first wireless communication terminal.

Moreover, the random access trigger frame may include type information for specifying the type of data transmitted by the second wireless communication terminal. At this time, the type of data may indicate the type of priority that data has. The specific operations of the first wireless communication terminal 400 and the second wireless communication terminal 500 according to the type information may be the same as those described with reference to FIGS. 11 to 13.

The second wireless communication terminal 500 randomly accesses the first wireless communication terminal based on the random access trigger frame (S1403). The second wireless communication terminal 500 may transmit data to the first wireless communication terminal 400 based on the random access trigger frame. Specifically, the second wireless communication terminal 500 may obtain the information on the designated frequency band based on the random access trigger frame, and randomly access to the designated frequency band to transmit the data to the first wireless communication terminal 400. In a specific embodiment, the second wireless communication terminal 500 may randomly select at least one of a plurality of sub-frequency bands included in the frequency band indicated by the random access trigger frame. At this time, the second wireless communication terminal 500 may transmit data to the first wireless communication terminal 400 through the selected at least one sub-frequency band. Also, the second wireless communication terminal 500 may obtain the duration allocation information from the random access trigger frame, and may transmit the data to the first wireless communication terminal 400 based on the duration allocation information. The specific operation of the second wireless communication terminal 500 may be the same as that described with reference to FIGS. 7 to 10.

The second wireless communication terminal 500 may transmit information on the buffer status to the first wireless communication terminal 400 based on the random trigger frame. At this time, the information on the buffer status may be the more data information described with reference to FIGS. 7 and 8. In addition, the information on the buffer status may indicate the size of data stored in the buffer. The information on the buffer status may be included in a field indicating information on QoS control of the MAC header. The specific format of the information on the buffer status may be the same as that in the embodiment described with reference to FIGS. 11 to 13.

In another specific embodiment, the second wireless communication terminal 500 may transmit a MAC frame for setting a NAV of the wireless communication terminal to the first wireless communication terminal 400 based on the random access trigger frame. At this time, the specific operations of the second wireless communication terminal 500 and the first wireless communication terminal may be the same as those in the embodiment described with reference to FIG. 9.

Also, the first wireless communication terminal 400 may specify the duration value of the L-SIG field to be set when the second wireless communication terminal 500 transmits data. At this time, the first wireless communication terminal 400 may set the duration value of the L-SIG field to a time required for the second wireless communication terminal 500 to transmit data. Specifically, the duration value of the L-SIG field of the first wireless communication terminal 400 may be the duration allocation information described above. Also, the first wireless communication terminal 400 may set the duration value of the L-SIG field, including the time of transmitting the response to the data transmission of the second wireless communication terminal 500. At this time, the response to the data transmission of the second wireless communication terminal 500 may be a plurality of station block ACK frames.

Specifically, the second wireless communication terminal 500 may transmit the value of the duration field of the designated L-SIG field through the random access trigger frame. In addition, the second wireless communication terminal 500 may transmit the value of the duration field of the designated L-SIG field through the trigger frame. The specific operations of the second wireless communication terminal 500 and the first wireless communication terminal 400 may be the same as those described with reference to FIG. 10.

Although some specific embodiments of the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal wirelessly communicating with a base wireless communication terminal, the wireless communication terminal comprising:
    a transceiver; and
    a processor,
    wherein the processor is configured to receive, by using the transceiver, a wireless signal including a trigger frame from the base wireless communication terminal, and
    transmit, by using the transceiver, buffer status information including a plurality of bits and a queue data size field to the base wireless communication terminal based on the trigger frame, wherein the queue data size field indicates a size of data which corresponds to a type indicated by the plurality of bits and stored in a transmission buffer using a variable granularity of the size of the data, wherein each of the plurality of bits corresponds to each of a plurality of types of the data, wherein a number of the plurality of bits is 4, and
    wherein the each of the plurality of bits corresponds to each of access categories video (AC VI), access categories voice (AC VO), access categories best effort (AC BE), and access categories background (AC BK).

2. The wireless communication terminal of claim 1, wherein the queue data size field is capable of indicating a size of data corresponding to a plurality of types, wherein the plurality of types of the data are indicated by the plurality of bits.

3. The wireless communication terminal of claim 1, wherein the each of the plurality of bits corresponds to each of a plurality of access categories.

4. The wireless communication terminal of claim 1, wherein the variable granularity of the size of the data is determined by the wireless communication terminal.

5. The wireless communication terminal of claim 1, wherein the processor is configured to transmit, by using the transceiver, a wireless signal including both the buffer status information and data.

6. The wireless communication terminal of claim 1, wherein the trigger frame is a random access trigger frame,
    wherein the random access trigger frame indicates a frequency band randomly accessed by a plurality of wireless communication terminals including the wireless communication terminal.

7. An operation method of a wireless communication terminal wireless communicating with a base wireless communication terminal, the method comprising:
    receiving a wireless signal including a plurality of bits and a trigger frame from the base wireless communication terminal; and
    transmitting buffer status information including a queue data size field to the base wireless communication terminal based on the trigger frame, wherein the queue data size field indicates a size of data which corresponds to a type indicated by the plurality of bits and stored in a transmission buffer using a variable granularity of the size of the data, wherein each of the plurality of bits corresponds to each of a plurality of types of data,
    wherein a number of the plurality of bits is 4, and
    wherein the each of the plurality of bits corresponds to each of access categories video (AC VI), access categories voice (AC VO), access categories best effort (AC BE), and access categories background (AC BK).

8. The operation method of claim 7, wherein the queue data size field is capable of indicating a size of data corresponding to a plurality of types, wherein the plurality of types of the data are indicated by the plurality of bits.

9. The operation method of claim 7, wherein the each of the plurality of bits corresponds to each of a plurality of access categories.

10. The operation method of claim 7, wherein the variable granularity of the size of the data is determined by the wireless communication terminal.

11. The operation method of claim 7, wherein the transmitting the buffer status information comprises transmitting a wireless signal including both the buffer status information and data.

12. The operation method of claim 7, wherein the trigger frame is a random access trigger frame,
    wherein the random access trigger frame indicates a frequency band randomly accessed by a plurality of wireless communication terminals including the wireless communication terminal.

* * * * *